(12) United States Patent
Chang et al.

(10) Patent No.: US 7,746,745 B2
(45) Date of Patent: Jun. 29, 2010

(54) METHOD FOR DETERMINING THE TYPE OF DIGITAL VERSATILE DISC

(76) Inventors: Ricky Chang, c/o 8F, No. 533, Chung-Cheng Rd., Hsin-Tien City, Taipei Hsien (TW); Allen Lu, c/o 8F, No. 533, Chung-Cheng Rd., Hsin-Tien City, Taipei Hsien (TW)

(*) Notice: Subject to any disclaimer, the term of this patent is extended or adjusted under 35 U.S.C. 154(b) by 816 days.

(21) Appl. No.: 10/908,745

(22) Filed: May 25, 2005

(65) Prior Publication Data

US 2005/0265187 A1    Dec. 1, 2005

Related U.S. Application Data

(60) Provisional application No. 60/574,665, filed on May 25, 2004.

(30) Foreign Application Priority Data

Sep. 15, 2004 (TW) ............................. 93127819 A
Oct. 6, 2004 (TW) ............................. 93130202 A

(51) Int. Cl.
  *G11B 7/00* (2006.01)
(52) U.S. Cl. .................. 369/53.2; 369/53.22; 369/53.1
(58) Field of Classification Search .............. 369/53.23, 369/53.22, 53.1
  See application file for complete search history.

(56) References Cited

U.S. PATENT DOCUMENTS

| 5,003,521 | A | 3/1991 | Yoshida et al. |
| 5,381,392 | A | 1/1995 | Hira |
| 5,506,824 | A | 4/1996 | Fairchild et al. |
| 5,724,325 | A | 3/1998 | Jeong |
| 5,745,460 | A | 4/1998 | Tateishi |
| 5,764,610 | A | 6/1998 | Yoshida et al. |
| 5,831,952 | A | 11/1998 | Yamada et al. |
| 5,903,531 | A | 5/1999 | Satoh et al. |

(Continued)

FOREIGN PATENT DOCUMENTS

BR    PI0418819 A    11/2007

(Continued)

OTHER PUBLICATIONS

Search and Examination Report for GB Application No. 0324645.1, Mail Date Nov. 22, 2004, 8 pages.

(Continued)

*Primary Examiner*—Van N Chow
(74) *Attorney, Agent, or Firm*—Perkins Coie LLP

(57) ABSTRACT

A method for determining the type of a digital versatile disc (DVD) so that a DVD+ can be distinguished from a DVD–. The main steps for determining the type of a DVD include setting up related parameters, reading a general wobble signal or a wobble signal within the general wobble signal from a DVD to obtain a peak hold value and a trough hold value. The peak and trough hold values of the general wobble signal are read to derive a peak-to-peak voltage. Finally, if the peak-to-peak voltage is greater than a predetermined threshold value, the DVD is classified as a DVD–, otherwise it is classified as a DVD+. Furthermore, a DVD-ROM disc can be determined.

20 Claims, 4 Drawing Sheets

U.S. PATENT DOCUMENTS

| | | | |
|---|---|---|---|
| 5,917,791 A | 6/1999 | Tsuchiya et al. | |
| 5,959,955 A | 9/1999 | Choi | |
| 6,005,832 A | 12/1999 | Kumagai | |
| 6,052,344 A | 4/2000 | Ueki | |
| 6,212,141 B1 | 4/2001 | Tanikawa et al. | |
| 6,249,499 B1 | 6/2001 | Andoh | |
| 6,295,260 B1 | 9/2001 | Shihara et al. | |
| 6,304,535 B1 | 10/2001 | Magome et al. | |
| 6,449,232 B1 | 9/2002 | Kuwahara et al. | |
| 6,459,666 B1 | 10/2002 | Yokoi | |
| 6,603,720 B1* | 8/2003 | Kuroda et al. | 369/53.23 |
| 6,700,847 B2 | 3/2004 | Osada | |
| 6,728,181 B2 | 4/2004 | Shimoda et al. | |
| 6,747,931 B1 | 6/2004 | Park | |
| 6,760,289 B1 | 7/2004 | Ide | |
| 6,807,136 B1 | 10/2004 | Grimm | |
| 6,816,443 B1 | 11/2004 | Hwang et al. | |
| 6,822,936 B2 | 11/2004 | Ono et al. | |
| 6,856,586 B2 | 2/2005 | Usui et al. | |
| 6,868,051 B2 | 3/2005 | Ogihara | |
| 6,909,678 B2 | 6/2005 | Morishima | |
| 6,925,039 B2 | 8/2005 | Yanagawa et al. | |
| 6,980,500 B2 | 12/2005 | Lu et al. | |
| 6,992,961 B2 | 1/2006 | Minase et al. | |
| 7,016,284 B2 | 3/2006 | Chou | |
| 7,046,593 B2 | 5/2006 | Ito | |
| 7,099,253 B2 | 8/2006 | Hsu et al. | |
| 7,136,340 B2 | 11/2006 | Ide et al. | |
| 7,570,561 B2 | 8/2009 | Tai | |
| 7,602,684 B2 | 10/2009 | Chen et al. | |
| 2002/0015017 A1 | 2/2002 | Kwag | |
| 2002/0075780 A1* | 6/2002 | Ogihara | 369/53.23 |
| 2002/0105895 A1 | 8/2002 | Tanaka | |
| 2002/0126607 A1 | 9/2002 | Yamamoto et al. | |
| 2002/0150017 A1* | 10/2002 | Ono et al. | 369/53.23 |
| 2003/0099171 A1 | 5/2003 | Ito | |
| 2003/0103428 A1 | 6/2003 | Lu et al. | |
| 2004/0081049 A1 | 4/2004 | Chan | |
| 2004/0090883 A1 | 5/2004 | Lee et al. | |
| 2004/0090895 A1 | 5/2004 | Lee et al. | |
| 2004/0130986 A1 | 7/2004 | Minase et al. | |
| 2004/0218497 A1* | 11/2004 | Choi et al. | 369/53.23 |
| 2005/0047300 A1* | 3/2005 | Ono et al. | 369/53.23 |
| 2005/0058036 A1* | 3/2005 | Chen et al. | 369/53.2 |
| 2005/0105433 A1 | 5/2005 | Juan et al. | |
| 2005/0226114 A1 | 10/2005 | Liow et al. | |
| 2005/0265188 A1 | 12/2005 | Chang et al. | |
| 2005/0265189 A1 | 12/2005 | Tai | |
| 2006/0198268 A1 | 9/2006 | Chan | |
| 2009/0103402 A1 | 4/2009 | Liow et al. | |

FOREIGN PATENT DOCUMENTS

| | | | |
|---|---|---|---|
| BR | PI0418821 A | 11/2007 | |
| CN | 1348181 | 5/2002 | |
| CN | 1366660 | 8/2002 | |
| CN | 1490790 | 4/2004 | |
| CN | 1591643 A | 3/2005 | |
| CN | 1601639 | 3/2005 | |
| CN | 1637909 | 7/2005 | |
| CN | 1658312 A | 8/2005 | |
| CN | 1700311 | 11/2005 | |
| DE | 10349161 A1 | 6/2004 | |
| EP | 0725395 | 6/1996 | |
| EP | 0784321 | 7/1997 | |
| EP | 0811971 | 12/1997 | |
| EP | 0813192 | 12/1997 | |
| EP | 0903735 | 3/1999 | |
| GB | 2394596 | 4/2004 | |
| JP | 10302381 | 11/1998 | |
| JP | 2000078392 | 3/2000 | |
| JP | 2000315355 A | 11/2000 | |
| JP | 2000322742 | 11/2000 | |
| JP | 2001126376 | 5/2001 | |
| JP | 2001167510 | 6/2001 | |
| JP | 2001265620 | 9/2001 | |
| JP | 2002007156 | 1/2002 | |
| JP | 2002119830 A | 4/2002 | |
| JP | 2002312933 A | 10/2002 | |
| JP | 2003016441 | 1/2003 | |
| JP | 2003016641 A | 1/2003 | |
| JP | 2003078392 | 3/2003 | |
| JP | 2003217135 | 7/2003 | |
| TW | 200511273 | 3/2003 | |
| TW | 200539114 | 12/2005 | |
| TW | 200539115 | 12/2005 | |
| TW | 253060 | 4/2006 | |
| TW | 1298156 | 8/2008 | |
| WO | WO03/005350 | 1/2003 | |
| WO | WO-2005117008 A1 | 12/2005 | |
| WO | WO-2005117009 A1 | 12/2005 | |

OTHER PUBLICATIONS

Search and Examination Report for GB Application No. 0324645.1, Mail Date Feb. 9, 2004, 1 page.

German Search Report for German Application No. 10349161.9, Mail Date Nov. 17, 2004, 4 pages.

International Publication with Search Report for PCT Application No. PCT/CN2004/001531; Applicant: Via Technologies, Inc.; Date of Mailing: Mar. 31, 2005; 19 pages.

Written Opinion for Application No. PCT/CN2004/001531; Applicant: Via Technologies, Inc.; Date of Mailing: Apr. 7, 2005; 4 pages.

International Preliminary Examination Report on Patentability for PCT Application No. PCT/CN2004/001531; Applicant: Via Technologies, Inc.; Date of Issuance: Nov. 29, 2006; 5 pages.

International Publication with Search Report for PCT Application No. PCT/CN2004/001409; Applicant: Via Technologies, Inc.; Date of Mailing: Mar. 10, 2005; 21 pages.

Written Opinion for Application No. PCT/CN2004/001409; Applicant: Via Technologies, Inc.; Date of Mailing: Mar. 10, 2005; 4 pages.

International Preliminary Examination Report on Patentability for PCT Application No. PCT/CN2004/001409; Applicant: Via Technologies, Inc.; Date of Issuance: Nov. 29, 2006; 5 pages.

First Office Action for TW Patent Application No. 93127819; Issued by the Taiwan Intellectual Property Office on Jun. 24, 2008; 7 pages [summary attached].

Second Office Action for TW Patent Application No. 93127819; Issued by the Taiwan Intellectual Property Office on Jun. 24, 2008; 6 pages [summary attached].

Third Office Action for TW Patent Application No. 93127819; Issued by the Taiwan Intellectual Property Office on Jul. 29, 2009; 11 pages [summary attached].

Fourth Office Action for TW Patent Application No. 93127819; Issued by the Taiwan Intellectual Property Office on Nov. 11, 2009; 6 pages [translation attached].

First Office Action for TW Patent Application No. 91310202; Issued by the Taiwan Intellectual Property Office on Mar. 21, 2008; 5 pages [summary attached].

* cited by examiner

METHOD FOR DETERMINING THE TYPE OF DIGITAL VERSATILE DISC

CROSS-REFERENCE TO RELATED APPLICATION

This application claims the priority benefits of U.S. provisional application titled "NEW METHOD OF IDENTIFYING ROM/R/RW TYPE OF DVD DISC (USING TE SIGNAL, RECD SIGNAL AND RFLVL SIGNAL)" filed on May 25, 2004, Ser. No. 60/574,665. All disclosure of this application is incorporated herein by reference. This application also claims the priority benefit of Taiwan applications serial no. 93130202, filed on Oct. 6, 2004, serial no. 93127819, filed on Sep. 15, 2004. All disclosure of these Taiwan applications is incorporated herein by reference.

BACKGROUND OF THE INVENTION

1. Field of the Invention

The present invention relates to a method for determining the type of digital versatile discs (DVD). More particularly, the present invention relates to a method of distinguishing between a DVD− and a DVD+ disc.

2. Description of the Related Art

Digital versatile disc (DVD) is now a very popular optical storage medium. Aside from the read-only DVD-ROM (the "ROM" part refers to a read-only memory), DVD that can be used for recording data is available. DVD that can be used for recording data can be further classified into DVD− and DVD+ according to specifications. At present most DVD players are compatible to a number of specifications. Therefore, the technique of determining the type of a DVD is quite important.

At present, the method of determining the type of a DVD includes using the positional information embedded within a pre-groove wobble signal (wobble signal in short). According to DVD standard specifications, a DVD-ROM does not have a wobble signal. However, both the DVD− and the DVD+ have wobble signals beside ordinary tracks. The source of the wobble signal can be seen with reference to FIG. 1. When the optical disc rotates inside a DVD player, the pick up head 101 will slide away from the track 102 in an outward direction. The relative positions of the four areas A, B, C, D in the photo diode IC (the photosensitive diode integrated circuit) of the pick-up head 101 are set up as shown in FIG. 1. Hence, each area will receive a signal of different magnitudes. The wobble signal is obtained using the following formula:

$$G \times [g1 \times (A+D) - g2 \times (B+C)],$$

where G, g1 and g2 are adjustable gain values.

DVD− and DVD+ each has a positioning scheme mixed within the wobble signal that permits the extraction of positional information by decoding using a logic computational circuit. FIG. 2 shows the wobble signal of a DVD+. The wobble signal 201 includes a plurality of phase-changing regions 202. After decoding the wobble signal 201 in a logic computational circuit, positional information is obtained. FIG. 3 shows the wobble signal of a DVD−. The wobble signal 301 includes a plurality of land pre-pits 302. Similarly, positional information can be gathered after the wobble signal is decoded in a logic computational circuit. As shown in FIGS. 2 and 3, DVD+ and DVD− produce different wobble signals and the decoding function of each logic computational circuit is different. Thus, these differences can be utilized to determine the type of a DVD.

FIG. 4 is a flowchart showing the steps of the prior art method for determining the type of a DVD. First, assuming an optical disc placed inside the DVD player is a DVD+ so that parameters related to DVD+ are set up (step 402). An attempt is made to read data about the current position information (step 404). If the current position information is read successful, the optical disc is determined to be a DVD+ (step 406). Otherwise, the optical disc is assumed to be a DVD− and parameters related to a DVD− are set up (step 408). Thereafter, another attempt is made to read data about the current position information (step 410). If the current position information is read successful, the optical disc is determined to be a DVD− (step 412). Otherwise, the optical disc is determined to be a DVD-ROM (step 414).

One major drawback of the aforementioned method is that the related parameters of the DVD+ and the DVD− must encompass most types of optical discs. For an optical disc that has been used to record data before, the quality of positional information on the disc may deteriorate and lead to errors. Hence, a method capable of reducing errors in distinguishing between a DVD+ and a DVD− is required.

SUMMARY OF THE INVENTION

Accordingly, the present invention provides a method for determining the type of a digital versatile disc (DVD) so that the errors in determining the type of a disc is minimized and the probability of correctly distinguishing between DVD+ and DVD− is improved.

To achieve these and other advantages and in accordance with the purpose of the present invention, as embodied and broadly described herein, the present invention provides a method for determining the type of a DVD. First, a set of related parameters are set. According to the preset parameters, a general wobble signal (including a wobble signal and other signals that can be simultaneously read) is read from a DVD and then the magnitude of the wobble signal is calibrated to a predetermined standard value. After calibrating the magnitude of the wobble signal, the peak hold value and the trough hold value of the general wobble signal are read to derive the peak-to-peak voltage (generally the result is obtained after an analogue to digital conversion). Finally, if the peak-to-peak voltage is greater than a predetermined threshold value, the DVD is classified as a DVD−, otherwise it is classified as a DVD+. Obviously, if the peak-to-peak voltage is zero or smaller than another predetermined threshold value, the DVD is classified as a DVD-ROM.

In another embodiment of the present invention, the magnitude of the general wobble signal is calibrated to another predetermined standard value after reading the general wobble signal. Then, the peak hold value and the trough hold value of the wobble signal are read to derive the peak-to-peak voltage. Finally, as above mentioned embodiment, comparing the peak-to-peak voltage with the other two predetermined threshold values to determine the type of a DVD.

The present invention utilizes the magnitude of the peak-to-peak voltage of a wobble signal or a general wobble signal instead of the positional information embedded within the wobble signal to determine the type of a DVD and distinguish between a DVD− and a DVD+. Therefore, the setbacks caused by using the conventional technique are removed and the probability of correctly determining the type of a DVD is increased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
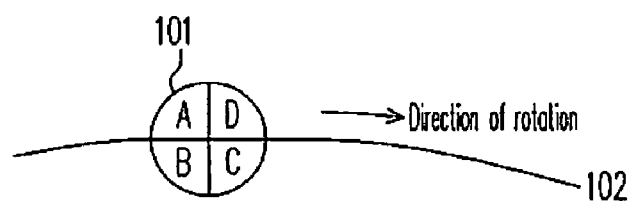
FIG. 1 is a diagram showing the source of a wobble signal.

Reference will now be made in detail to the present preferred embodiments of the invention, examples of which are illustrated in the accompanying drawings. Wherever possible, the same reference numbers are used in the drawings and the description to refer to the same or like parts.

In the following embodiment, the present invention provides a method for determining the type of a digital versatile disc (DVD). The critical step in one embodiment of the present invention is to read out a general wobble signal (comprising a wobble signal and other signals that can be read out simultaneously) and find out the peak hold value and the trough hold value. Thereafter, the peak-to-peak voltage (for example, the difference between a peak hold value and a neighboring trough hold value, and generally the result is obtained after an analogue-to-digital conversion) of the general wobble signal is derived. According to the magnitude of the peak-to-peak voltage, a DVD+ can be readily distinguished from a DVD− (or even a DVD-ROM). The difference in peak-to-peak voltage between these two types of DVD can be seen in FIGS. 2 and 3.

Figure 2:
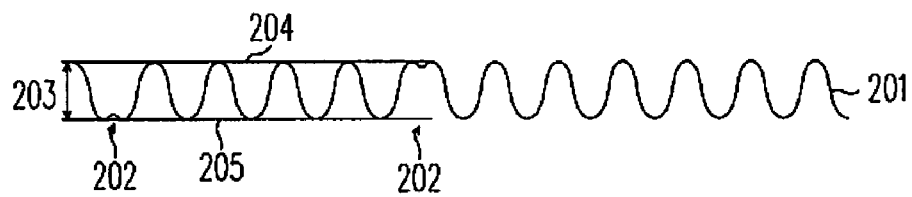
FIG. 2 shows the wobble signal of a DVD+.

FIG. 2 shows a general wobble signal of a DVD+ which comprises only a wobble signal 201 and a plurality of phase-changing regions 202. In FIG. 2, the peak hold value of the wobble signal is labeled 204 while the trough hold value of the wobble signal is labeled 205. The two hold values are the top edge and the bottom edge of the wobble signal 201 respectively. The peak-to-peak voltage 203 is the value obtained after subtracting the trough hold value 205 from the peak hold value 204. In other words, the peak-to-peak voltage 203 is the magnitude of the variation in the wobble signal 201. Obviously, the peak-to-peak voltage 203 can be the difference between neighboring top edge and bottom edge.

Figure 3:
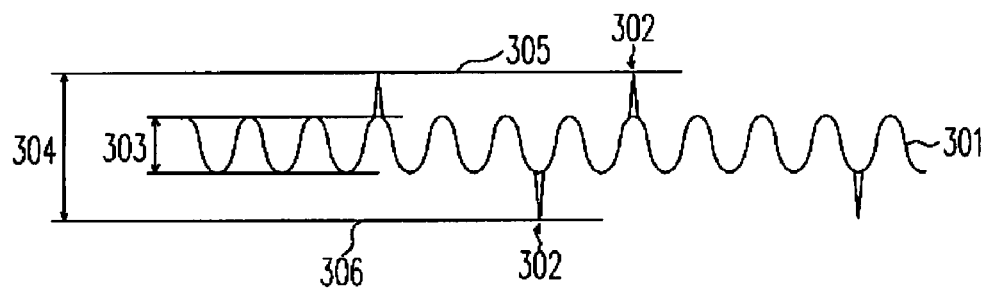
FIG. 3 shows the wobble signal of a DVD−.
Figure 4:
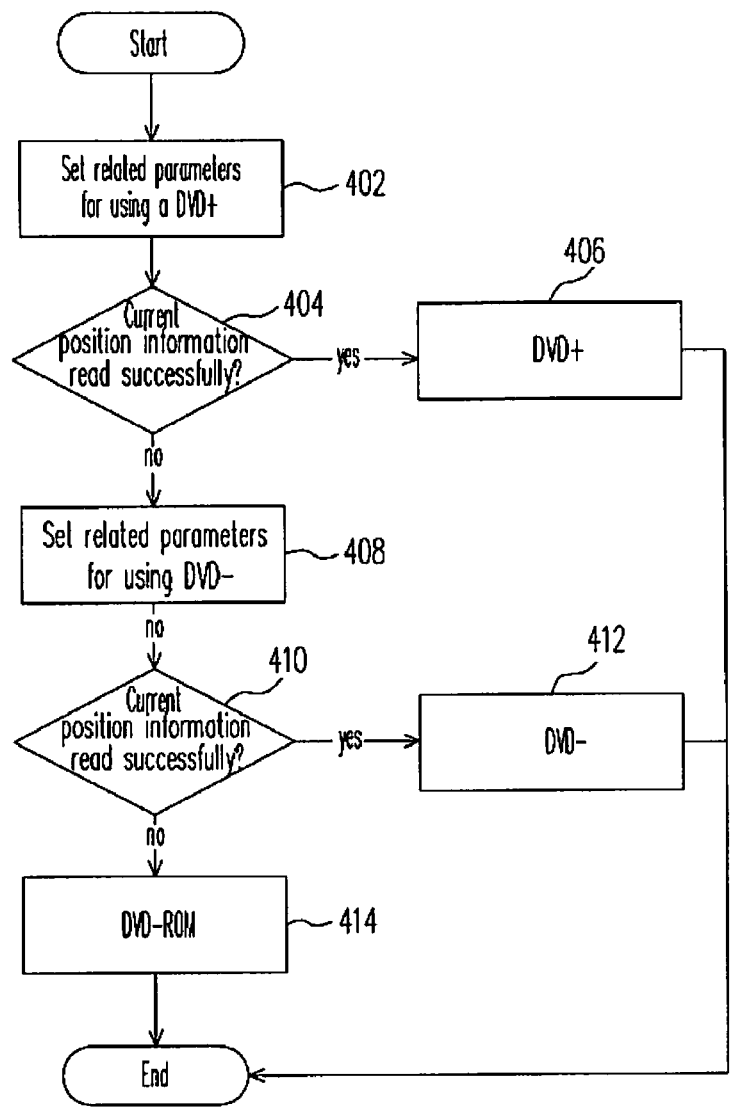
FIG. 4 is a flowchart showing the steps in a conventional method of determining the type of a DVD.

FIG. 3 shows a more complicated general wobble signal of a DVD−. The general wobble signal of a DVD− as shown in FIG. 3 comprises a wobble signal 301 and land pre-pits 302 associated with the wobble signal 301. Hence, the peak hold value 305 is located at the sharp end of the land pre-pit 302 above the peak of the wobble signal 301, and the trough hold value 306 is located at the sharp end of the land pre-pit 302 below the trough of the wobble signal 301. Due to the difference between these two hold values, the peak-to-peak voltage 304 is much bigger than the magnitude of a variation 303 of the wobble signal 301. Obviously, the peak-to-peak voltage 304 can be the difference between the land pre-pit above the wobble signal and an adjacent land pre-pit below the wobble signal.

In the present embodiment, the difference between a DVD+ and a DVD− is determined by the difference in the peak-to-peak voltage 203 of a DVD+ from the peak-to-peak voltage 304 or 303 of a DVD−. Because the general wobble signal of a DVD− has land pre-pits and the general wobble signal of a DVD+ has no land pre-pits, there is a large difference in the peak-to-peak voltage between a DVD+ and a DVD− and provides a way for distinguishing the type of a DVD. Furthermore, the present embodiment may adjust the magnitude of the wobble signal within the general wobble signal coming from different DVD to a value close to a predetermined standard value. Therefore, any magnitude difference due solely to the type of DVD can be eliminated and the difference in peak-to-peak voltage is due solely to the presence of land pre-pits. In other words, the present invention can distinguish between a DVD− and a DVD+ more readily than the conventional scheme does. In addition, other signals associated with the general wobble signal may also be proportionally adjusted by an adjusting ratio of the wobble signal (e.g., the ratio by which the wobble signal is adjusted).

Figure 5:
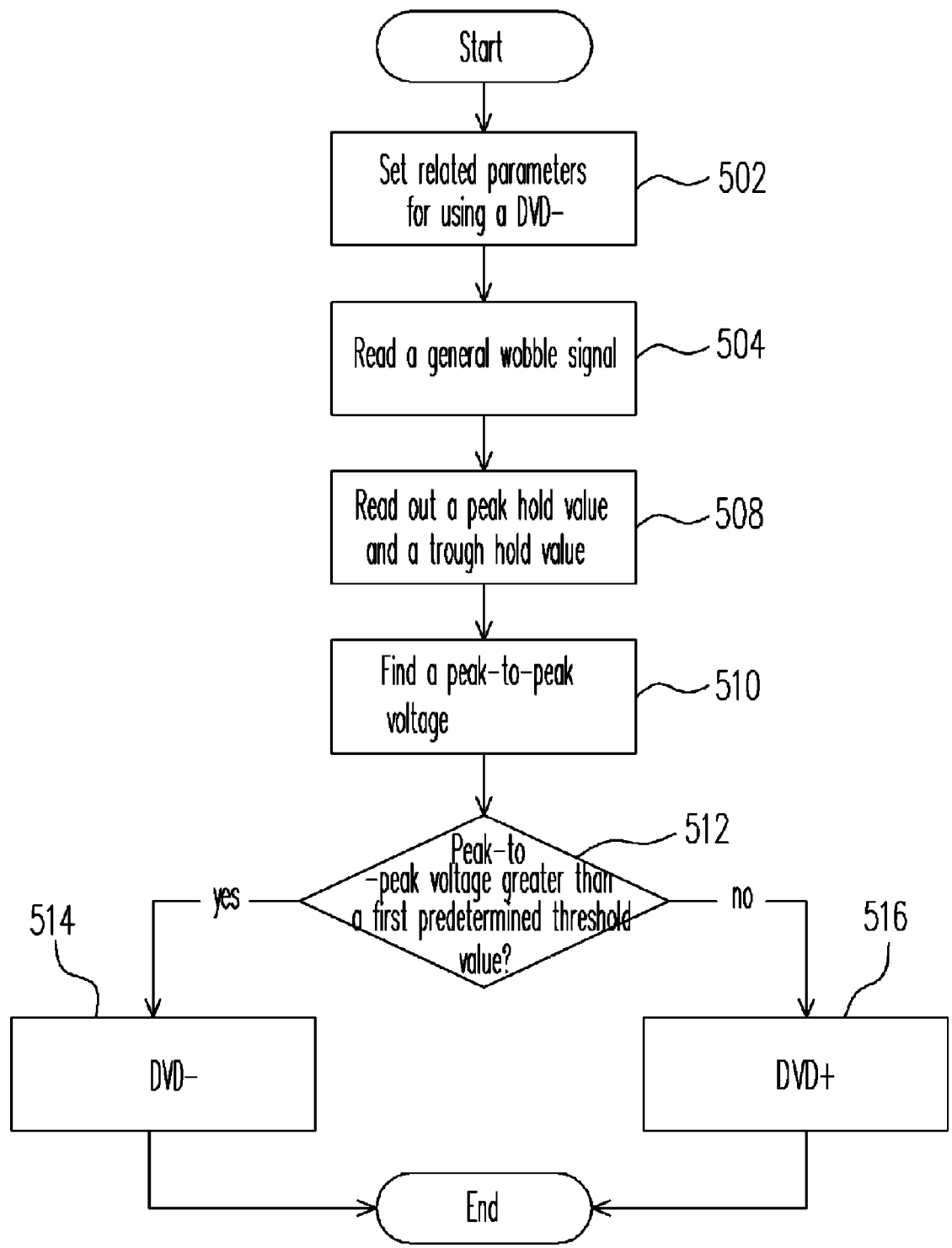
FIG. 5 is a flowchart showing the steps for determining the type of a DVD according to one preferred embodiment of the present invention.

FIG. 5 is a flowchart showing the steps for determining the type of a DVD according to one preferred embodiment of the present invention. First, an unknown optical disc placed inside a DVD player is assumed to be a DVD−. Therefore, in step 502, related parameters for using DVD− are set. In step 504, the parameters set up in step 502 are used to read a general wobble signal from the unknown optical disc. The peak hold value and the trough hold value of the wobble signal within the general wobble signal are read out in step 508. Thereafter, in step 510, the peak-to-peak voltage of the wobble signal is derived using the peak and trough hold values. The peak-to-peak voltages of the wobble signals of DVD− and DVD+ are different due to the characteristics of DVD− and DVD+ so that appropriate thresholds can be selected to distinguish DVD− from DVD+. Thus, in step 512, the peak-to-peak voltage is compared with a first predetermined threshold value to determine if the peak-to-peak voltage is greater than the first predetermined threshold value. If the peak-to-peak voltage is greater than the first predetermined threshold voltage, the unknown optical disc is classified as a DVD− in step 514. Otherwise, the unknown optical disc is classified as a DVD+ in step 516.

Accordingly, the present invention utilizes the peak-to-peak voltage of a wobble signal to determine the type of DVD instead of the positional information embedded within a wobble signal, which is used by the conventional technique. Hence, the drawbacks inherent in the conventional technique are completely removed and the probability of correctly determining the type of a DVD is significantly increased.

Figure 6:
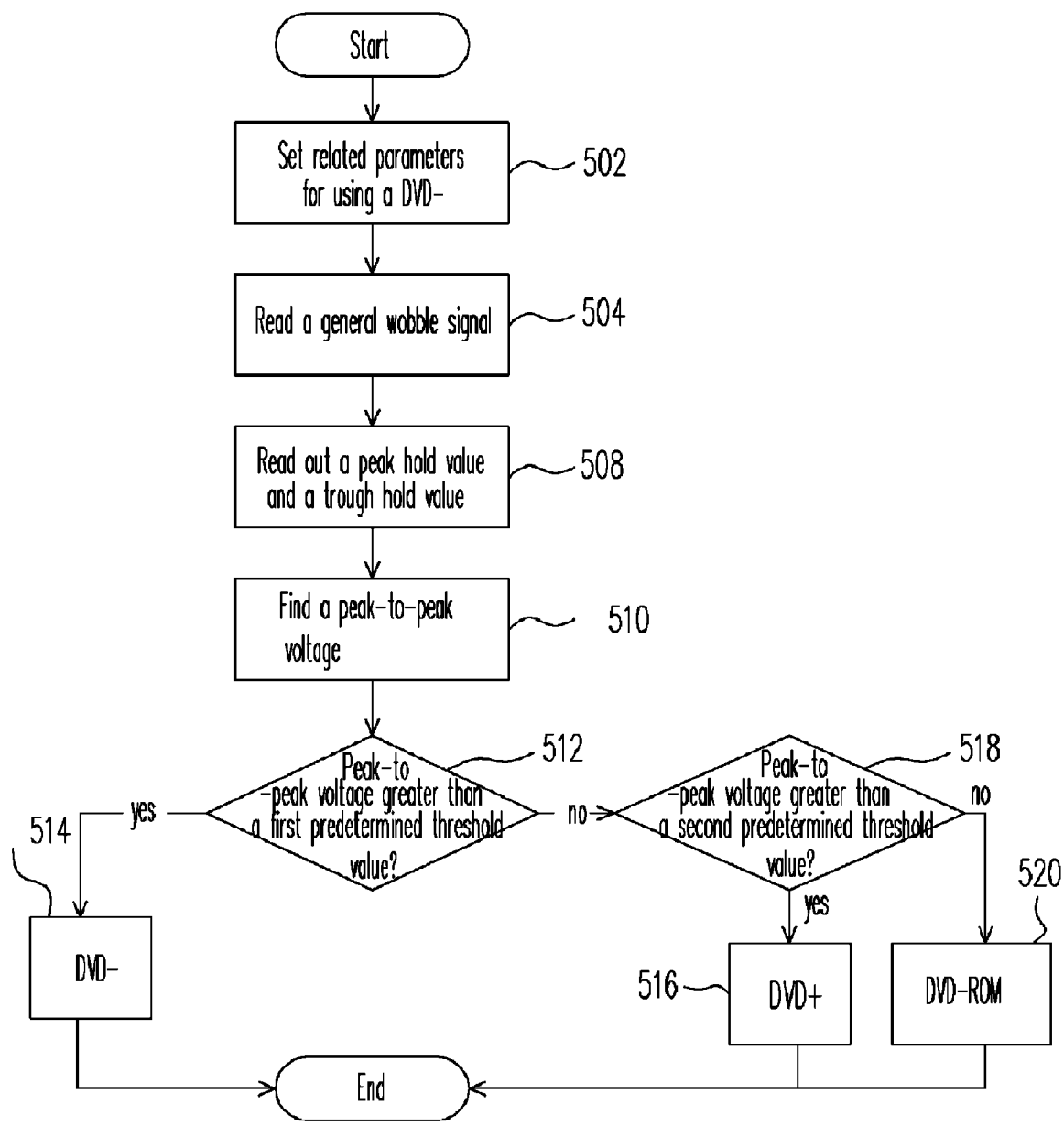
FIG. 6 is a flowchart showing the steps for determining the type of a DVD according to another preferred embodiment of the present invention.

Furthermore, the absence of a wobble signal in a DVD-ROM, that is, the wobble signal having zero amplitude can be utilized as well. In another embodiment of the present invention, the flowchart in FIG. 5 is modified to the one shown in FIG. 6. After finding the peak-to-peak voltage to be smaller than a first predetermined threshold value in step 512, the unknown optical disc is not immediately classified to be a DVD+. Instead, step 518 is carried out to determine if the peak-to-peak voltage is greater than a second predetermined threshold voltage (which is smaller than the first predetermined threshold value and may be close to zero, for example, 0.03V). If it is, the unknown optical disc is determined to be a DVD+ in step 516, otherwise the unknown optical disc is determined to be a DVD-ROM in step 520.

In the above embodiment, before reading the peak hold value and the trough hold value of the wobble signal within the general wobble signal in step 508, the magnitude of the general wobble signal can be calibrated close to a first predetermined standard value to eliminate the magnitude difference coming from different DVD.

Abovementioned embodiment is based on the peak-to-peak voltage of the wobble signal to determine the type of a DVD. However, in another embodiment of the present invention, a peak-to-peak voltage of the general wobble signal can be utilized to determine the type of a DVD. The flow chart of the embodiment is similar as the flow chart shown in FIG. 6. In the embodiment, a peak hold value and a through hold value of the general wobble signal is read out in step 508, and a peak-to-peak voltage of the general wobble signal is derived by the peak and trough hold values obtained by the step 508. Next, compares the peak-to-peak voltage with two predetermined threshold values to determine the type of a DVD (DVD−, DVD+, or DVD-ROM). The two predetermined threshold values in the embodiment can be different from the one used in abovementioned embodiment. Before reading the peak and trough hold values of the general wobble signal in step 508, the magnitude of the wobble signal within the general wobble signal can be calibrated close to a second predetermined standard value to eliminate the magnitude difference coming from different DVD. The second predetermined standard value can be different from the first predetermined standard value in abovementioned embodiment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for determining a type of a digital versatile disc (DVD), comprising:
   receiving a general wobble signal, wherein the general wobble signal comprises at least a wobble signal and other signals on the DVD that are read with the wobble signal;
   finding a peak-to-peak voltage from the general wobble signal;
   determining the type of the DVD according to the peak-to-peak voltage from the general wobble signal, comprising:
      indicating the DVD as a DVD− if the peak-to-peak voltage from the general wobble signal is greater than a first predetermined threshold;
      indicating the DVD as a DVD-ROM if the peak-to-peak voltage from the general wobble signal is less than a second predetermined threshold; and
      indicating the DVD as a DVD+ if the peak-to-peak voltage from the general wobble signal is less than or equal to the first predetermined threshold and is greater than or equal to the second predetermined threshold, wherein the first predetermined threshold is greater than the second predetermined threshold; and
   adjusting a magnitude of the wobble signal or a magnitude of the general wobble signal to be at least approximately equal to a predetermined standard voltage.

2. The method of claim 1, wherein the peak-to-peak voltage from the general wobble signal is a peak-to-peak voltage of the general wobble signal instead of a peak-to-peak voltage of the wobble signal.

3. The method of claim 2, wherein finding the peak-to-peak voltage from the general wobble signal comprises:
   reading out a peak hold value and a trough hold value of the general wobble signal; and
   deriving the peak-to-peak voltage of the general wobble signal according to a difference between the peak hold value and the trough hold value.

4. The method of claim 2, wherein the peak-to-peak voltage of the general wobble signal is a difference between the peak end of a land pre-pit above the general wobble signal and a trough end of an adjacent land pre-pit below the general wobble signal of a DVD−.

5. The method of claim 2, wherein the peak-to-peak voltage of the general wobble signal is a difference between a peak edge of the general wobble signal and an adjacent trough edge of the general wobble signal of a DVD+.

6. The method of claim 1, wherein the peak-to-peak voltage from the general wobble signal is a peak-to-peak voltage of the wobble signal instead of a peak-to-peak voltage of the general wobble signal.

7. The method of claim 6, wherein the adjusting the magnitude of the wobble signal or the magnitude of the general wobble signal is performed after receiving the general wobble signal and before finding the peak-to-peak voltage from the general wobble signal and includes adjusting the magnitude of the general wobble signal to be at least approximately equal to a predetermined standard value.

8. The method of claim 6, wherein finding the peak-to-peak voltage from the general wobble signal further comprises:
   reading out a peak hold value and a trough hold value of the wobble signal; and
   deriving the peak-to-peak voltage of the wobble signal according to a difference between the peak hold value and the trough hold value.

9. The method of claim 1, further comprising:
   before receiving the general wobble signal setting parameters to enable reading of the general wobble signal from the DVD.

10. The method of claim 9, wherein setting parameters for reading the general wobble signal comprises:
    setting parameters to correspond to DVD− parameters that enable reading of the general wobble signal from the DVD.

11. A method for determining a type of a digital versatile disc (DVD), comprising:
    receiving a general wobble signal, wherein the general wobble signal comprises at least a wobble signal and other signals on the DVD that are read with the wobble signal;
    determining a peak-to-peak voltage from the general wobble signal;
    determining the type of the DVD according to the peak-to-peak voltage from the general wobble signal, comprising:
       indicating the DVD as a DVD− if the peak-to-peak voltage from the general wobble signal is greater than a first predetermined threshold;
       indicating the DVD as a DVD-ROM if the peak-to-peak voltage from the general wobble signal is less than a second predetermined threshold; and
       indicating the DVD as a DVD+ if the peak-to-peak voltage from the general wobble signal is less than or equal to the first predetermined threshold and is greater than or equal to the second predetermined threshold, wherein the first predetermined threshold is greater than the second predetermined threshold; and adjusting a magnitude of the wobble signal or a magnitude of the general wobble signal to be at least approximately equal to a predetermined standard voltage.

12. The method of claim 11, wherein the peak-to-peak voltage from the general wobble signal is a peak-to-peak voltage of the general wobble signal instead of a peak-to-peak voltage of the wobble signal.

13. The method of claim 12, wherein determining the peak-to-peak voltage from the general wobble signal comprises:
reading out a peak hold value and a trough hold value of the general wobble signal; and
deriving the peak-to-peak voltage of the general wobble signal according to a difference between the peak hold value and the trough hold value.

14. The method of claim 12, wherein the peak-to-peak voltage of the general wobble signal is a difference between the peak end of a land pre-pit above the general wobble signal and a trough end of an adjacent land pre-pit below the general wobble signal of a DVD−.

15. The method of claim 12, wherein the peak-to-peak voltage of the general wobble signal is a difference between a peak edge of the general wobble signal and an adjacent trough edge of the general wobble signal of a DVD+.

16. The method of claim 11, wherein the peak-to-peak voltage from the general wobble signal is a peak-to-peak voltage of the wobble signal instead of a peak-to-peak voltage of the general wobble signal.

17. The method of claim 16, wherein the adjusting the magnitude of the wobble signal or the magnitude of the general wobble signal is performed after receiving the general wobble signal and before finding the peak-to-peak voltage from the general wobble signal and includes adjusting the magnitude of the general wobble signal to be at least approximately equal to a predetermined standard value.

18. The method of claim 16, wherein determining the peak-to-peak voltage from the general wobble signal further comprises:
reading out a peak hold value and a trough hold value of the wobble signal; and
deriving the peak-to-peak voltage of the wobble signal according to a difference between the peak hold value and the trough hold value.

19. The method of claim 11, further comprising:
before receiving the general wobble signal setting parameters to enable reading of the general wobble signal from the DVD.

20. The method of claim 19, wherein setting parameters for reading the general wobble signal comprises:
setting parameters to correspond to DVD− parameters that enable reading of the general wobble signal from the DVD.

* * * * *